2 Sheets--Sheet 1.

J. J. RALYA.

Stave-Jointer.

No. 6,461. Reissued May 25, 1875.

WITNESSES:
Jas E. Hutchinson
John R. Young

INVENTOR:
Jno. J. Ralya, by
Prindle and Lay his Attys

THE GRAPHIC CO. PHOTO-LITH. 39 & 41 PARK PLACE, N.Y.

2 Sheets--Sheet 2.

J. J. RALYA.

Stave-Jointer.

No. 6,461. Reissued May 25, 1875.

WITNESSES:
Jas. E. Hutchinson
John R. Young

INVENTOR:
Jno. J. Ralya, by
Prindle and Co. his Attys

THE GRAPHIC CO. PHOTO-LITH. 39 & 41 PARK PLACE, N.Y.

UNITED STATES PATENT OFFICE.

JOHN J. RALYA, OF CLEVELAND, OHIO.

IMPROVEMENT IN STAVE-JOINTERS.

Specification forming part of Letters Patent No. 138,762, dated May 13, 1873; reissue No. 6,461, dated May 25, 1875; application filed February 17, 1875.

DIVISION A.

*To all whom it may concern:*

Be it known that I, JOHN J. RALYA, of the city of Cleveland, in the county of Cuyahoga, State of Ohio, did invent certain new and useful Improvements in Stave-Jointers, for which Letters Patent No. 138,762 were issued to me upon the 13th day of May, 1873, and which Letters Patent have been found defective, in that the specification and claims do not cover and embrace all of the original invention as shown in the model and drawings filed in the Patent Office upon the 31st day of August, 1871, and the 29th of November, 1871, respectively. Now, therefore, being desirous of reissuing said Letters Patent, herewith surrendered, I have prepared, and do hereby declare that the following is, a full, clear, and exact description of the said invention, reference being had to the accompanying drawings, making a part of this specification, in which—

Figure 1:
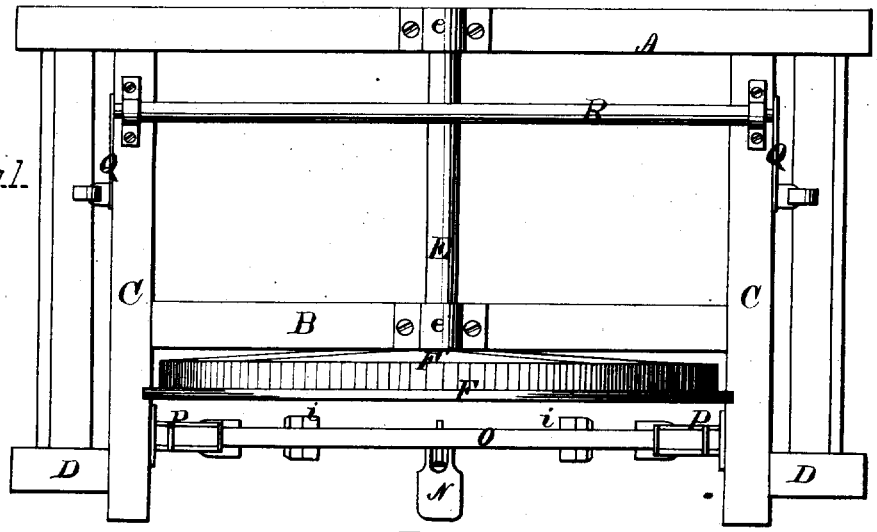
Figure 2:
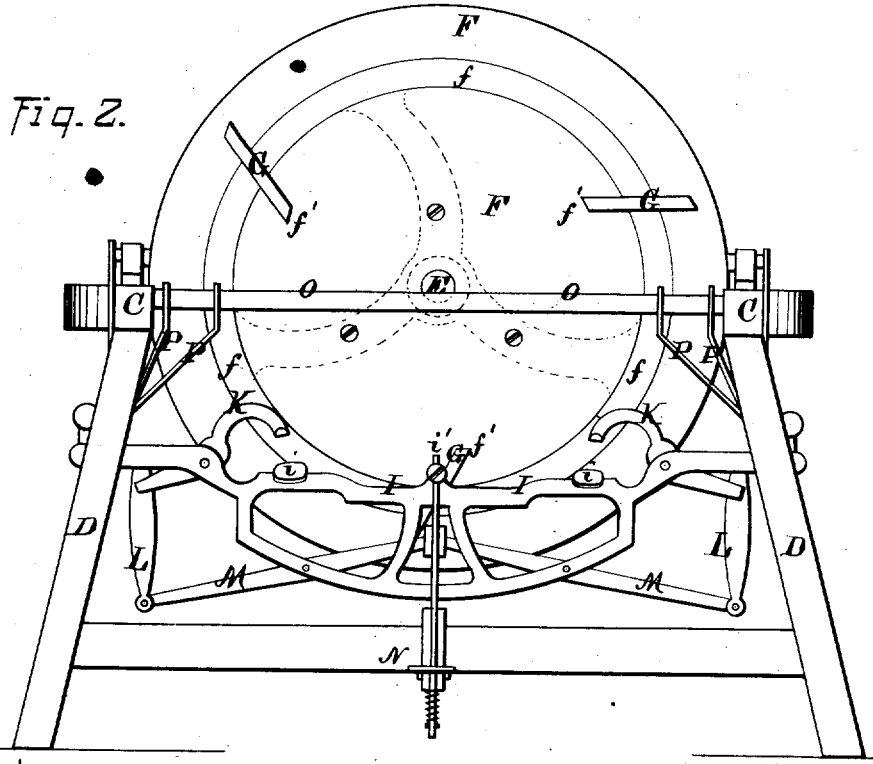
Figure 3:
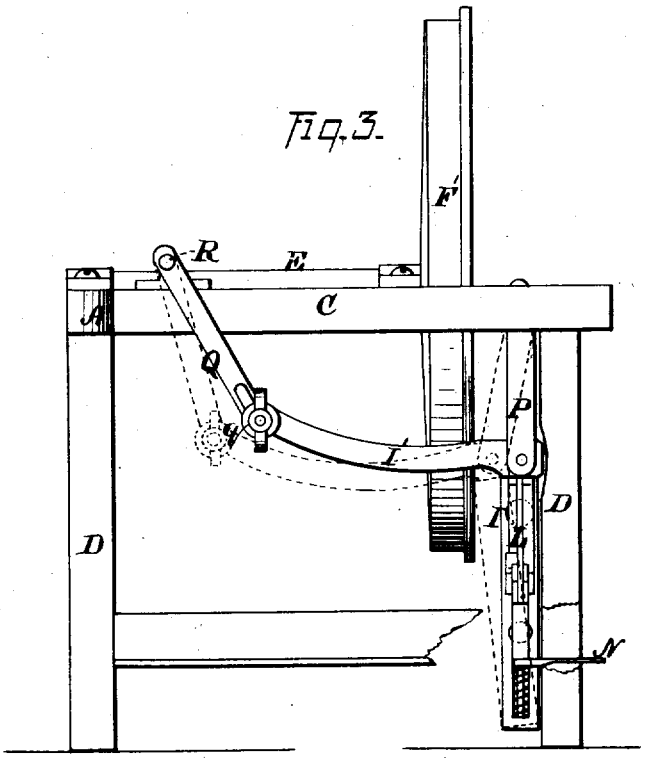
Figure 4:
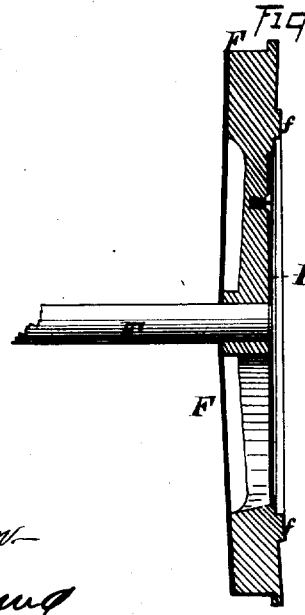

Figure 1 is a plan view of the upper side of my improved machine. Fig. 2 is an elevation of the front side of the same. Fig. 3 is a like view of one end of said machine. Fig. 4 is a central section of the cutter-wheel upon a line extending from front to rear.

Letters of like name and kind refer to like parts in each of the figures.

The design of this invention is to enable barrel-staves to be jointed by machinery with greater ease and accuracy than is practicable by hand-tools; to which end it consists, principally, in a cutter-wheel having a dishing front side, and provided with a ridge which intersects the cutter-openings, substantially as and for the purpose hereinafter shown. It consists, further, in the means employed for lessening the friction of the air upon the cutter-wheel, substantially as is hereinafter set forth. It consists, further, in the means employed for insuring the relative angles of the faces of the cutter-wheel, and the table employed for supporting the staves while being jointed, substantially as and for the purpose hereinafter shown and described. It consists, finally, in the means employed for securing the staves in position upon their supporting-table while being operated upon, substantially as is hereinafter specified.

In the annexed drawings, A and B represent two rails, which are arranged in parallel lines, and connected together by means of two cross-bars, C and C, supported by or upon four legs, D D, &c., said parts forming the frame of my machine. Journaled within suitable bearings *e* and *e*, which are secured at the upper side and longitudinal centers of the rails A and B, is a shaft, E, that extends sufficiently beyond said rail B to enable a wheel, F, to be attached to or upon its end. The wheel F consists of a hub, from which extends radially outward several arms that, at their outer ends, are connected to or with a broad rim, as seen in Figs. 2 and 4. The front side of said wheel is made concave, and upon the face of its rim is formed a concentric ridge, *f*, which is raised slightly above the adjacent surface. At two or more points within the rim of the wheel F are provided suitable openings *f'* for the reception of cutters G, which openings have the usual form of similar portions of a wood-plane, and longitudinally are slightly divergent from lines radiating from the center of said wheel. The open portion of the wheel F is covered in front and rear by means of sheet-metal plates F' and F', which cause said sides to present smooth, uniform surfaces, and to cause but slight friction as they rotate within the air. Within each opening *f'* is secured a cutter, G, which has the form of an ordinary plane-iron, and is provided with a cap that is adjustable toward or from the cutting-edge of said cutter. The ridge *f* is at the longitudinal centers of the openings *f'* and *f'*, and when the cutters G and G are caused to project to the proper distance beyond the face of said ridge, it will be seen that each cutter may be turned so as to cause either corner to be thrown forward without material change of the relative positions of its central portion and the face of said ridge. This construction enables the line of the cutting-edge of each cutter to be set more or less dishing with relation to the face of the wheel, as may be required. The stave to be jointed is placed upon a frame, I, where it is held in position by means of two levers or clamps, K and K, which are so pivoted as to enable their inner ends to be forced downward upon the ends of said stave, and confine the same upon the bearings *i* and *i* provided therefor. A bar, L, is pivoted at one end to or upon the outer end of each clamp K, and at its opposite end to the outer end of a lever, M, while the latter is in turn pivoted centrally upon the frame I, in such position as to bring its opposite inner end to or near the longitudinal center of said frame, where said lever and the contiguous end of the opposite lever M are connected together and to a foot-treadle, N, the arrangement being such as to cause said clamps to gripe a stave whenever said treadle is depressed.

At or near the longitudinal center of the frame I is provided a central bearing, *i'*, for the center of a stave, which bearing is sufficiently elevated above the end bearings *i* and *i* to cause the stave to have the desired curvature while being dressed or jointed. The frame I is suspended from a rod, O, which is placed horizontally across the front, and near the vertical center of the wheel F by means of suitable links or bars P and P, that are pivoted to and extend between the ends of said frame and rod, and enable the former to be swung toward or from said wheel. In order that the edges of the stave may be formed, when dressed, upon radial lines, it is necessary that the portion of the frame upon which the stave is clamped should move toward or from the cutter-wheel upon a curved line, the axis of which corresponds to the center of the barrel being finished. This result is accomplished by securing rigidly to each end of the frame I, immediately inside of its pivotal bearing, an arm, I', which extends rearward, and at its rear end is pivoted to or upon the end of an arm, Q, that is secured to and extends downward from one end of a shaft, R. The shaft R is suitably journaled upon the upper side of the cross-bars C and C, and turns freely within its bearings as the frame I is moved inward or outward.

It will be seen that when the frame I is moved outward the rear end of the arm I' is raised, and the upper or bearing face of said frame inclined downward and outward, while, when said frame is moved inward, its bearing-face inclines more nearly to the horizontal, the effect being the same as though said frame were pivoted to its lower side, and swung upon such pivotal bearing. The arm Q is slotted longitudinally, so as to permit the screw *q*, which pivots the same and the arm I' together, to be moved toward or from the shaft R, the result of such changes being to lessen or increase the diameter of the circle traveled by the upper end of the frame I, and correspondingly change the relative angles of the edges and faces of staves being dressed.

As thus constructed, the machine is operated as follows: An undressed stave is laid, with its inner face downward, upon the bearings *i i* and *i'*, and the clamps K and K caused to bear upon and confine its ends in position, after which the frame I is moved toward the wheel F until the contiguous edge of said stave is brought into contact with the cutters G and G, and dressed to the desired angle.

It will be observed that the stave is placed upon a curved line near the lower side of the wheel, so that its ends are first cut away by contact with the outer ends of the cutters, while its central portion is cut by the inner ends of the same, so that by increasing or lessening the angle of said cutters from their plane of motion, as is permitted by the dishing of the wheel, a greater or less amount of stock will be cut from the ends of said stave, and the bilge or swell of its central portion be correspondingly increased or diminished.

If the cutters were set exactly in a line with their plane of revolution, the edges of the stave, when dressed, would be parallel; but by placing said cutters at an angle therefrom, a bilge corresponding to such angle is produced.

The especial object of the ridge *f* is to furnish a bearing for the ends of the stave at a time when the cutters are working across the grain, and, if not properly supported, would tear the same. The inner portions of said cutters require no support, for the reason that they cut with the grain, and are not liable to gouge or tear.

Having thus fully set forth the nature and merits of my invention, what I claim as new is—

1. In a stave-jointing machine, a cutter-wheel having its sides made smooth and uniform by means of sheet-metal covering-plates, substantially as and for the purpose shown.

2. In a stave-jointing machine, a cutter-wheel made concave, and provided upon its outer face with a ridge, which intersects the cutter-openings, substantially as and for the purpose set forth.

3. In combination with the frame I, suspended from or by means of the link-bars P and P, the arms I' and I', shaft R, and arms Q and Q, all constructed to operate in the manner and for the purpose substantially as shown and described.

4. In combination with the frame I, provided with the bearings *i i* and *i'*, the clamps K and K, bars L and L, levers M and M, and treadle N, substantially as and for the purpose specified.

In testimony whereof I have hereunto set my hand this 12th day of February, 1875.

JOHN J. RALYA.

Witnesses:
H. E. PRINDLE,
W. H. RUNNELLS.